No. 633,136. Patented Sept. 19, 1899.
H. V. HARTZ.
MACHINE FOR PREPARING AND WELDING PIPE JOINTS.
(Application filed May 25, 1898.)
(No Model.) 4 Sheets—Sheet 1.
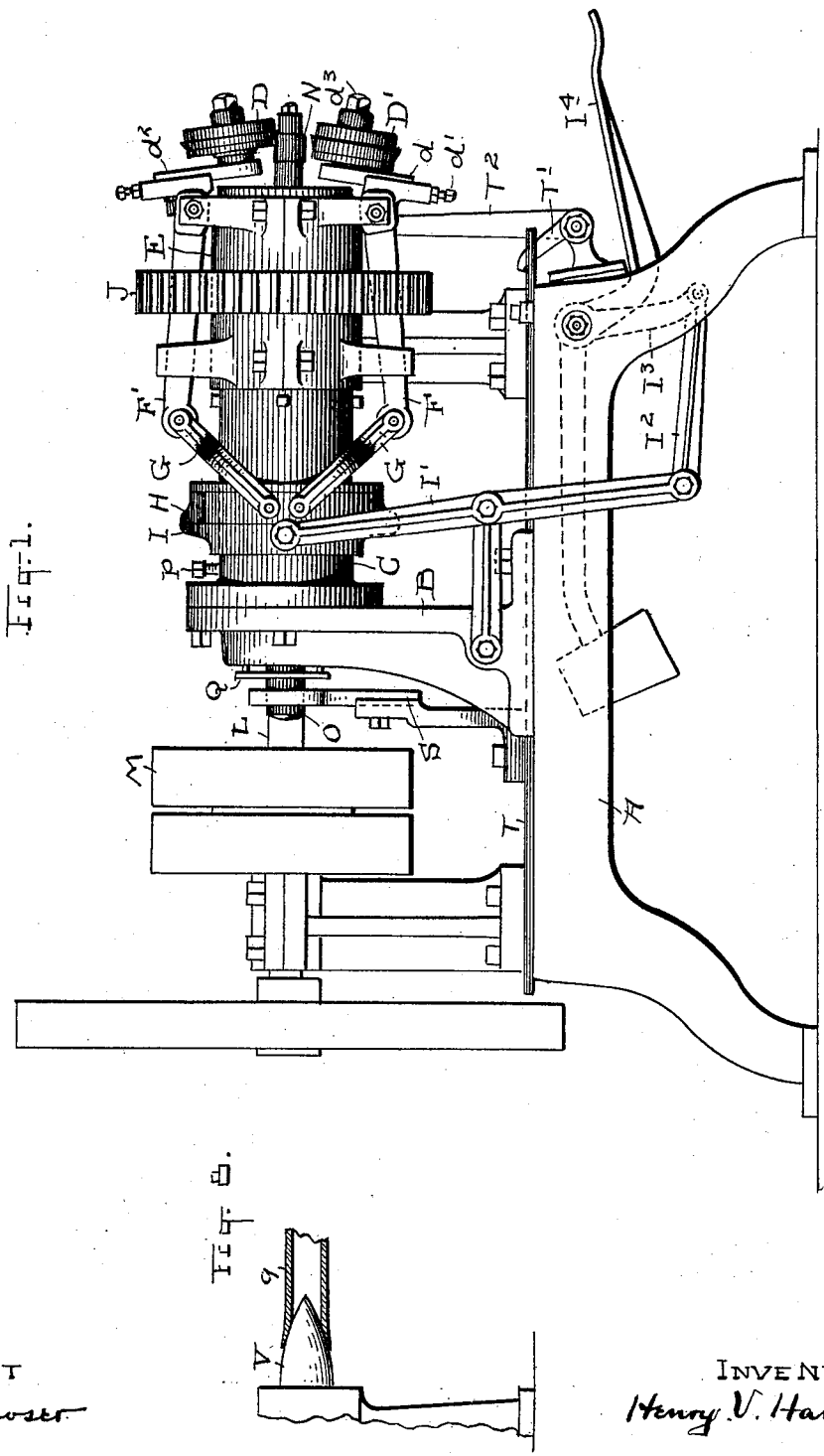
ATTEST
T. B. Moser
H. E. Mudra
INVENTOR.
Henry V. Hartz
By H. F. Fisher ATTY No. 633,136. Patented Sept. 19, 1899.
H. V. HARTZ.
MACHINE FOR PREPARING AND WELDING PIPE JOINTS.
(Application filed May 25, 1898.)
(No Model.) 4 Sheets—Sheet 2.
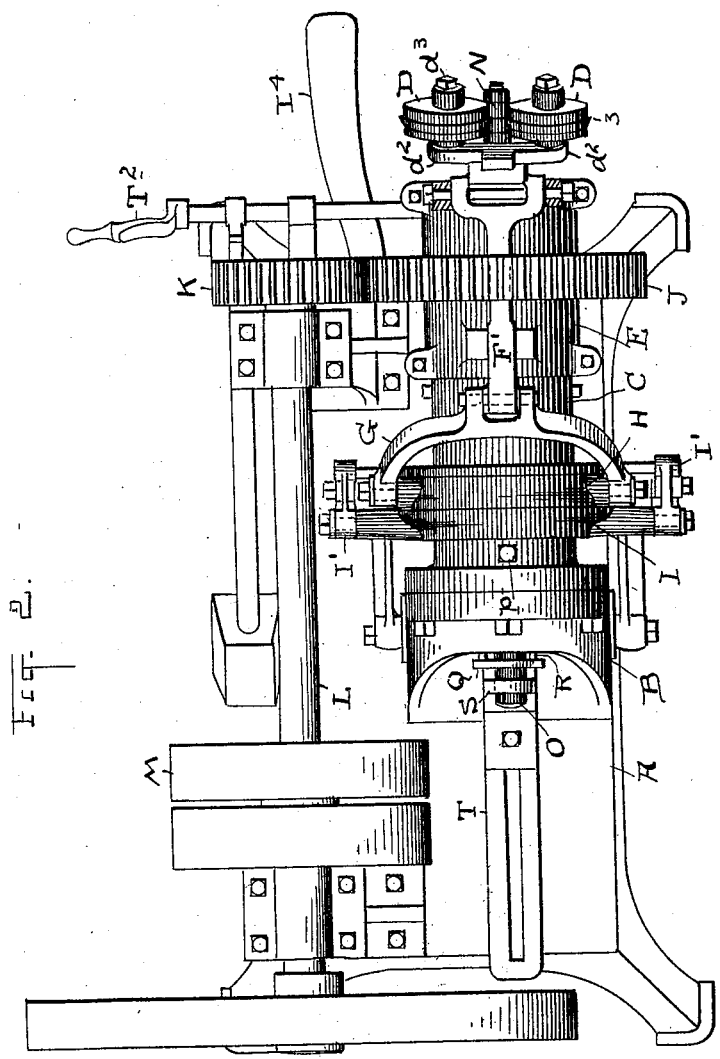
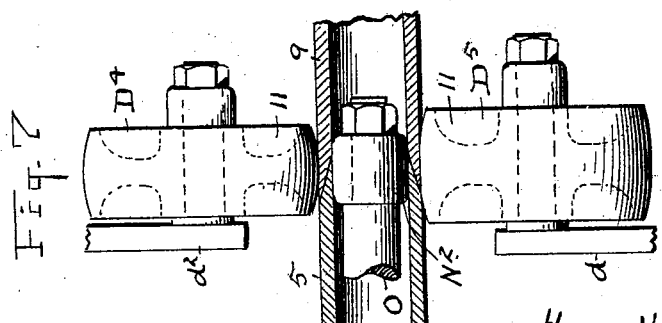
ATTEST
INVENTOR
Henry V. Hartz
BY H. F. Fisher ATTY
THE NORRIS PETERS CO., PHOTO-LITHO., WASHINGTON, D. C.

No. 633,136. Patented Sept. 19, 1899.
H. V. HARTZ.
MACHINE FOR PREPARING AND WELDING PIPE JOINTS.
(Application filed May 25, 1898.)
(No Model.) 4 Sheets—Sheet 3.
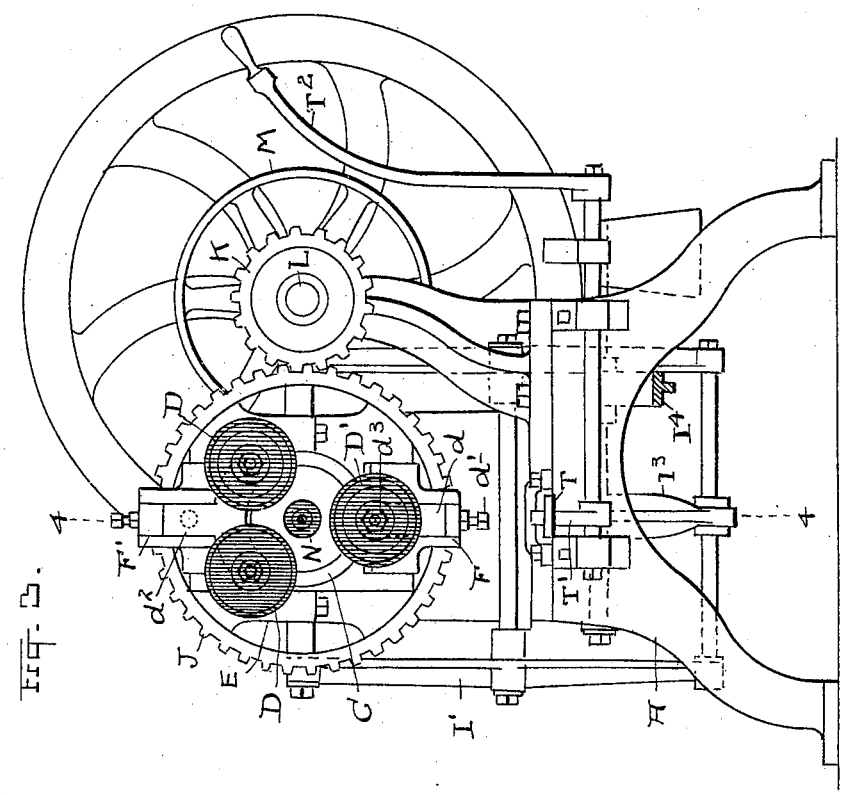
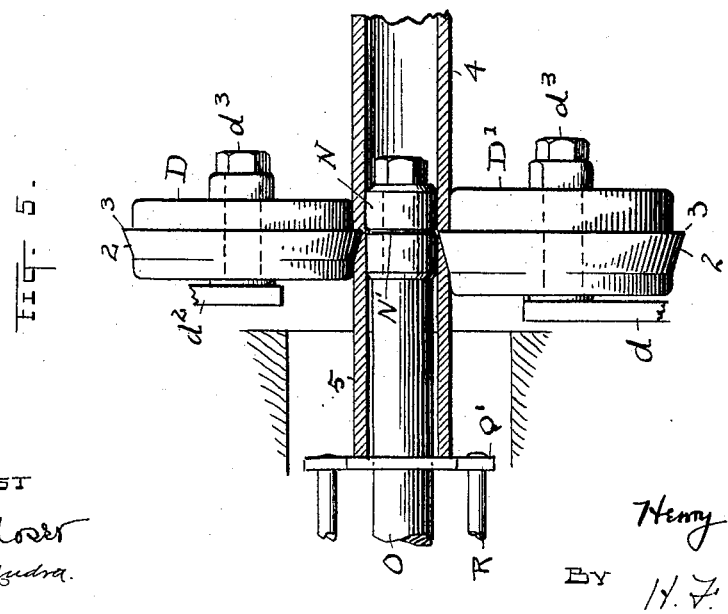
ATTEST
R. B. Moser
H. E. Mudra.
INVENTOR
Henry V. Hartz
BY H. F. Fisher
ATTY
THE NORRIS PETERS CO., PHOTO-LITHO., WASHINGTON, D. C.

No. 633,136. Patented Sept. 19, 1899.
H. V. HARTZ.
MACHINE FOR PREPARING AND WELDING PIPE JOINTS.
(Application filed May 25, 1898.)
(No Model.) 4 Sheets—Sheet 4.
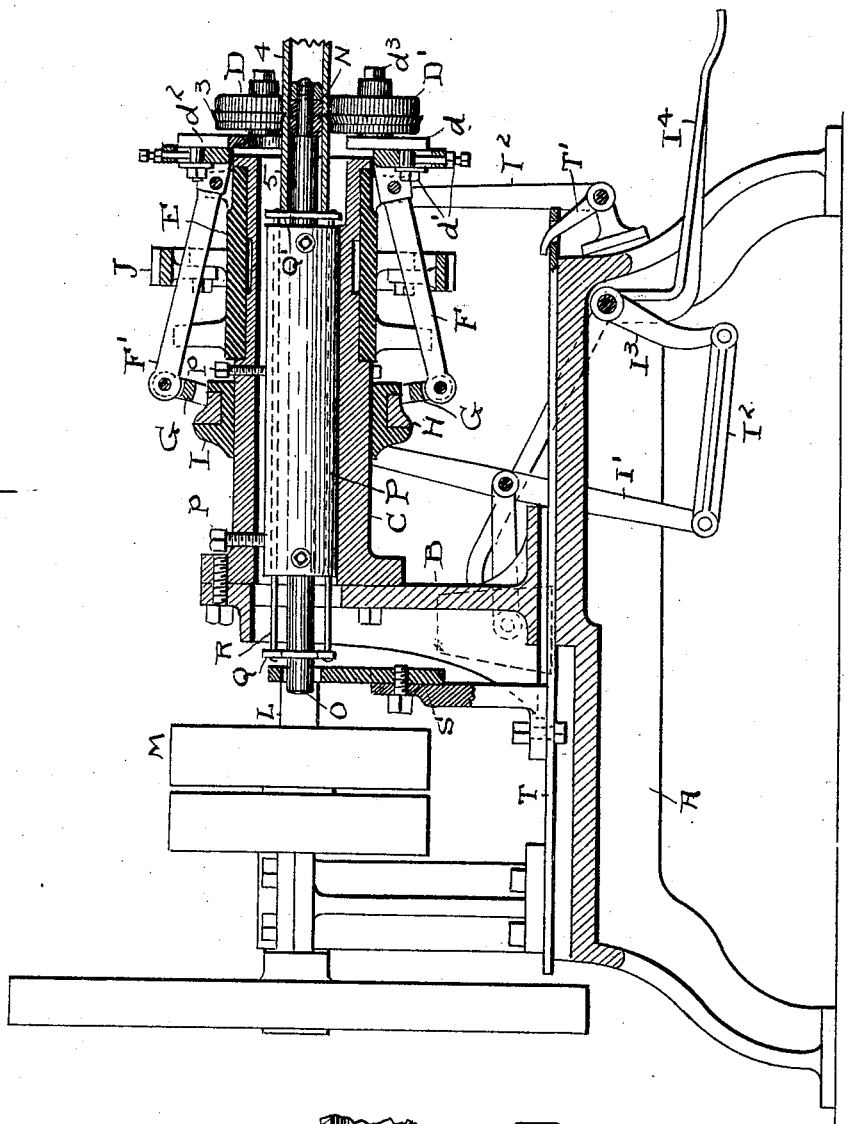
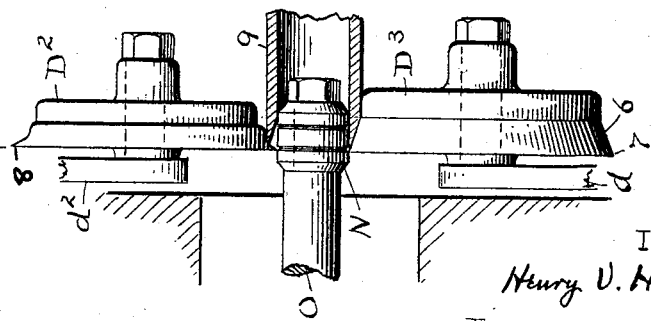
ATTEST
T. B. Moser
H. E. Mudra
INVENTOR
Henry V. Hartz
BY H. F. Fisher
ATTY

UNITED STATES PATENT OFFICE.

HENRY V. HARTZ, OF CLEVELAND, OHIO.

MACHINE FOR PREPARING AND WELDING PIPE-JOINTS.

SPECIFICATION forming part of Letters Patent No. 633,136, dated September 19, 1899.

Application filed May 25, 1898. Serial No. 681,688. (No model.)

*To all whom it may concern:*

Be it known that I, HENRY V. HARTZ, a citizen of the United States, residing at Cleveland, in the county of Cuyahoga and State of Ohio, have invented certain new and useful Improvements in Machines for Preparing and Welding Pipe-Joints; and I do declare that the following is a full, clear, and exact description of the invention, which will enable others skilled in the art to which it appertains to make and use the same.

My invention relates to machines for preparing and welding pipe-joints, and is more especially an improvement on my patent granted June 14, 1881, No. 243,037; and the improvement consists in the construction and arrangement of parts substantially as hereinafter shown and described, and more particularly pointed out in the claims.

In the accompanying drawings, Figure 1 is a side elevation of my improved machine. Fig. 2 is a plan view of the same. Fig. 3 is a front elevation. Fig. 4 is a longitudinal section on line 4 4 of Fig. 3, but in this view the operating parts are shown in working position. Fig. 5 is an enlarged detail view of two scarfing-rolls in scarfing relation with a short section of pipe. Fig. 6 is an enlarged detail of two cutting and shaping rolls repairing the end of a pipe. Fig. 7, Sheet 2, is an enlarged detail of two welding-rolls welding a short scarfed section of a pipe to the end of a flue. Fig. 8 is a small detail of the finishing-anvil.

A represents a base or frame upon which a standard B is firmly mounted. A lateral projecting head C is rigidly bolted to this standard, and the various operating parts for the three rollers D D D' are mounted thereon. These parts consist of the revolving head E, arms F F', pivoted on said head, yokes G, connecting the ends of arms F to the collar H, and the sliding sleeve I for said collar. The sliding sleeve I is operated by levers I' $I^2$ $I^3$ when pressure is applied to foot-lever $I^4$, and the different positions of these parts when in operating and out of operating positions are as shown in Figs. 1 and 4, respectively. A large gear J, forming part of revolving head E, serves to rotate the same when power is applied through pinion K, power-shaft L, and pulley M. The rollers D being supported on the arms F on head E revolve and rotate with the head and are three in number. One of them D' is heavier than the other two and is supported alone on a bracket $d$, adjustably fastened by bolts $d'$ in the end of arm F. The lighter rollers are jointly supported on a bracket $d^2$ on the other arm F', and this bracket is also adjustably fastened by bolts to the end of this arm. When the arms F and F' are actuated by means of the intermediate mechanism leading to the foot-lever $I^4$, the rollers D D' are brought into closer relation with a former N, located centrally between them. This former N is fastened to the end of a mandrel O, which is adjustably secured within a removable bushing P, held within head C by the bolts $p$. The mandrel O extends through the bushing P at each side and end plates Q Q', connected by rods R, which pass through the bushing-slide on the ends of the mandrel when actuated by arm S at the rear. This arm is mounted on a sliding plate T, which passes to the front, where it is engaged by an arm T', operated by a lever $T^2$.

The rollers D and D' are free to revolve on their studs, which project from their respective brackets $d$ $d^2$, and each roller is held in place by a nut $d^3$. These rollers are made removable to permit the replacing of other shaped rollers for the varying demands in the operation of preparing and welding pipes or boiler-tubes, and in this instance three several and distinct sets of rollers are used. The first set, called "scarfing-rolls," of which two are shown in Fig. 5, are used to cut and scarf short sections of pipe for use in repairing pipes or more especially boiler-tubes. The ends of boiler-tubes become ragged and worn, and when this occurs either new tubes of entire length must be substituted or else the end of the old tube must be cut off and a new piece consisting of a short section—say six to twelve inches—be welded on. In practice as many of these short tubes are cut and scarfed as are needed, and then the scarfing-rollers are removed and the second set is substituted. This second set of three rollers, of which two are shown in Fig. 6, are called the "spreading-rollers" and are designed to cut off the ragged end of the flues and also scarf and spread the end of the tube to a shape which permits of the joining of the short section of pipe prepared by the first set of rolls or rollers. The third set of rollers are used when the welding of the short section to the end of the tube is desired and as is shown in Fig. 7, wherein two of the welding-rollers are in working position. Each set of rollers has its own former N removably fastened to the end of mandrel O, and these formers are of different diameters to accommodate different sizes of pipe. It will be understood that the cutting, scarfing, and welding are done with the pipe heated to the necessary degree to permit a proper working of the same.

Now referring to Figs. 4 and 5, the cutting, scarfing, and forming of the short sections of pipe are disclosed, the operation of which is as follows: The rollers D and D' being in their normal position, as seen in Fig. 1, sufficient space about the former is had to allow the pipe to slip over the former and end of the mandrel until the end of the pipe is stopped by plate Q'. As the plate Q' is adjustable back and forth by means of the mechanism leading to the lever T², it will be seen that the length of the short section to be cut can be varied, as may be desired, or, as the bushing P is also adjustable within the head, the same can be moved forward or back to fix and set the length of the pipe to be cut, the end of which would abut against plate Q' and the end of bushing P. The pipe having been brought to a stop, treadle I⁴ is depressed, and the rollers D D' are brought into engagement with the pipe, the head E, carrying the rollers and its supports, revolving rapidly in the meanwhile. Each roller has an inclined surface 2 on its periphery, which terminates in a sharp edge 3; but the width of this inclined surface is less on the two lighter rolls D than on the heavier and wider roller D'. The sharp edges 3 of all the rollers are in a parallel line and opposite a groove N' in the former N. Now as the rollers are brought into engagement with the pipe 4 edges 3 revolve around and cut into the heated pipe until the short section 5 is severed from the main body 4. As this is being done the inclined surface 2 revolves about the pipe and forms the tapered or male end of the short section 5. The lighter rollers D do most of the cutting and rolling or tapering to an edge, while the heavy roller D', though assisting in this operation, more especially finishes and lengthens the taper. The rollers are now disengaged, and the lever T² is then operated to slide plates Q Q' forward and discharge the finished short section. The next step is to cut off the fag or ragged end of the flue to be prepared and so shape it as to make a female end, into which the male end of the short section will fit in such relation, so that a perfect welding of the two can be accomplished. To this end rollers D² and D³ of the form as shown in Fig. 6 are used, and in this form it will be seen that the lighter rollers D² are of a different shape than the single heavy roller D³. The heavy roller D³ has a long inclined surface 6, terminating in an edge 7, and the two lighter rollers D² have a sharp edge 8, parallel and similar to that of 7; but instead of a long inclined surface, like 6, the surface on the rollers D² is ogee in shape and terminates in an acute angle at the edge 8. The lighter rolls D² cut off the fag or ragged end quite rapidly, and of course edge 7 on roller D³ assists; but the object of the heavy roller, with its long incline 6, is to taper the end of the flue or pipe 9 and force the opposite side away from the former N and spread the end, the ogee shape of rollers D² allowing this to occur and at the same time shaping the end of the pipe 9, so that the taper will be practically transferred to the inside. The pipe is then taken off while still hot and the end forced over a conical anvil-point V, as seen in Fig. 8, to finish and round out the same. This forms the female end on flue 9, and when the short section 5 is fitted therein and heated to the proper degree the welding of the two is accomplished by means of the third set of rollers D⁴ and D⁵ (seen in Fig. 7) and which have plain surfaces 11, working with a plain-surfaced former N².

In my former patent, previously referred to, only two rollers were used and only one of these was active, and in practice if the closest attention was not exercised the scarfing of the ends would be difficult to accomplish and many times a pipe or flue would be spoiled. Where three rollers are used, as in the present specification, I can perform the work much faster and with far more safety and obtain a more uniform result than heretofore. This better result is also due to the fact that all the rollers are simultaneously brought into closer working relation to the former and are equally distant from the center, whereas in the old application only one roller was actively brought into play. By reason of having a mandrel with a removable former N various sizes of flues can be repaired on the same machine by merely changing the formers and a greater latitude of operation can be obtained than in my old way, where my mandrel and former were in one piece.

What I claim is—

1. In a machine for preparing and welding pipe-joints, an adjustable mandrel and a fixed head, a revolving head supported on said fixed head and arms and rollers to rotate therewith, a removable former on said mandrel, adjustable means within said fixed head to determine the length of pipe to be slipped over said mandrel, and means to actuate the same to discharge the finished product, substantially as described.

2. In a machine for preparing and welding pipe-joints, a series of three scarfing-rollers having inclined surfaces terminating in cutting edges on the periphery of said rollers, one of said rollers being heavier and having an inclined surface of greater width than the others for lengthening and finishing the taper of the work as received from the lighter rollers, in combination with a removable grooved former, and means to bring said rollers into working relation with said former, substantially as described.

3. In a machine for preparing and welding pipe-joints, a series of three spreading-rollers provided with cutting edges and inclined surfaces, two of said rollers having acute inclined ogee-shaped surfaces terminating in cutting edges for cutting the work and the other roller having a long inclined surface terminating in a cutting edge for tapering and spreading the work, the said ogee-shaped rollers transferring the taper from outside to inside of the work, in combination with a removable grooved former and means to bring said rollers into working relation with said former, substantially as described.

Witness my hand to the foregoing specification this 9th day of May, 1898.

HENRY V. HARTZ.

Witnesses:
H. T. FISHER,
R. B. MOSER.